Patented Apr. 29, 1952

2,594,827

UNITED STATES PATENT OFFICE 2,594,827

PROCESS FOR ADDITION OF MONOBASIC ORGANIC ACIDS TO THE ESTERS OF MONOHYDRIC ALKYNOLS

Richard S. Towne, South Bend, Ind., assignor to General Aniline & Film Corporation, New York, N. Y., a corporation of Delaware No Drawing. Application December 28, 1949, Serial No. 135,522

9 Claims. (Cl. 260—491)

This invention relates to an improved process for the addition of monobasic organic acids to the esters of certain monohydric alkynols. The liquid phase addition of monobasic organic acids, such as acetic acid, to the esters of terminally unsaturated acetylenic monohydric alcohols, such as propargyl alcohol and 2-methyl-3-butyn-2-ol in the presence of mercuric salts combined in acidic media, such as that produced by the use of boron trifluoride, produces unsaturated compounds which contain enolic ester groups.

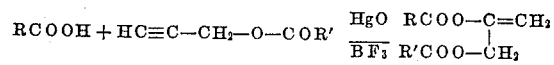

wherein R and R' are lower alkyl groups. The enolic ester groups are sensitive to strong acids and undergo certain side reactions such as rearrangement and hydrolysis, whereby the desired structure is destroyed. Furthermore, strongly acidic media promotes the addition of a second molecule of the organic acid so that a triester may be produced. These side reactions reduce the yield and make isolation of the unsaturated monomer difficult.

Catalysts which are neutral or basic would eliminate these side reactions but these catalysts are not effective in promoting the addition reaction in the liquid phase. I have now found that the mono-addition of monobasic organic acids to the esters of terminally unsaturated acetylenic monohydric alcohols may be accomplished in the vapor-phase using neutral or slightly basic catalysts supported on porous absorbent material such as coconut charcoal. The process includes the formation of vapors of the principal reacting ingredients, usually in a common still pot, passing these vapors through a catalyst bed such as a packed column, condensing the volatile overhead from the packed column and returning it outside the column back to the still pot. Any condensate in the packed column is returned directly to the still pot. In other words, the product of the reaction in the catalyst bed is continuously returned to the reaction mixture and the product of the reaction having a higher boiling point than the reactants accumulates in the still pot and is not again subjected to contact with the catalyst.

For the purposes of carrying out the process of this invention, the preferable apparatus includes a still pot externally heated which initially contains the reacting ingredients. An elongated packed column is located above the still pot so that the vapors from the still pot may rise and pass through the catalyst bed. Above the packed column is a condenser where the volatile material rising from the packed column is condensed and the condensate is returned by a conduit outside of the packed column back to the still pot.

The yields of unsaturated ester resulting from the process disclosed are superior to those obtained by the liquid phase reaction. The desired product is easily separated from unreacted material by fractional distillation without resorting to elaborate chemical treatment, since there is no catalyst to be neutralized as in the case of the liquid phase process.

The reaction involves the addition of one mole of an organic acid to the triple bond of an ester of an acetylenic alcohol. In my preferred process, a mixture of the acid and the ester is boiled and the mixed vapors passed upward, by means of a stream of an inert fluid such as nitrogen, through a catalyst chamber containing suitable zinc, cadmium or mercury salts preferably of the reacting acid supported on charcoal, silica gel or other porous media. The vapors are then condensed and recycled to the boiler. If the reaction is run at atmospheric pressure, the ester, the acid and the product used should be appreciably volatile at the catalyst temperatures used (200–250° C.), otherwise clogging of the catalyst bed by condensed reactants will occur. The use of an inert fluid, such as nitrogen, will materially assist the operation when reactants of low volatility are employed. Reducing the operating pressure below 760 mm. will also enable the process to be run using less volatile reactants.

The temperature of the catalyst bed should be above 180° C. and below the decomposition temperature of any of the reactants; for propargyl acetate this decomposition appears to start at approximately 260° C., so that in the examples the catalyst temperature is maintained between 180 and 260° C., preferably between 220–235° C., the operating pressure being atmospheric.

The rate of flow of the reactants through the catalyst bed may be widely varied. The rates in the examples below were such that 1.5 to 3.0 ml. of condensate per minute were delivered to the return line. Certain advantages are inherent in systems using high flow rates, such as the production of smaller amounts of byproducts and less decomposition of reactants and products, but this is off-set by lowered conversions. The operating conditions given represent a preferable compromise.

The reactions conditions are maintained in such a way as to avoid the formation of the triacetate: (a) temperatures below 250° C. preferred; (b) acid ratio not greater than 1:1 of acid-ester; (c) low contact time.

The following examples are illustrative of preferred embodiments of the invention but it will be understood that substitutions and variations may be made within the scope of the claims.

Example I 86.5 parts of silica gel were soaked in 117.6 parts of a solution of zinc acetate containing 21.8 parts of anhydrous zinc acetate dissolved in 95.8 parts of distilled water. The slurry was slowly evaporated with stirring and the resulting granules dried at 110° C. The catalyst was charged into the catalyst bed, and conditioned at 150–200° C. in a slow stream of nitrogen until no moisture was apparent in the affluent gases.

The still pot was then charged with 79.5 parts of absolute acetic acid (i. e. acetic acid dried by refluxing with a small portion of acetic anhydride) and 122.8 parts of pure propargyl acetate. The temperature of this mixture was raised to 120° C., and a slow stream of nitrogen gas started, the catalyst bed being heated to 220° C.

After two hours, during which time the catalyst bed became saturated with reactants, reflux began and the condensate, amounting to 1.5–3.0 ml./minute was recycled to the still pot. The temperature in the still pot rises from 120 to 147° C. during the course of 6 hours, the catalyst temperature varying from 192–210° C. At the end of 6 hours, the system was cooled and the liquid components drowned in water, separated and dried.

The dried product was fractionated yielding 60 parts of 1,2-diacetoxy propene-2 (30.3% of the theoretical yield) boiling at 65.5°/4 mm.

*Example II*

100 parts of coconut charcoal was impregnated with 125 parts of 20% zinc acetate solution. The mass was dried at 110° C., charged to the catalyst chamber and conditioned at 200° C. under a slow stream of nitrogen. 60.0 parts of absolute acetic acid and 122.5 parts of pure propargyl acetate were charged and brought to a temperature of 120° C. A slow stream of nitrogen was started, the catalyst bed being heated to 220° C. After 23 hours, during which time catalyst bed was maintained between 210 and 230° C., the temperature in the boiler had risen to 145° C. At the end of this time the reaction was stopped and the product diluted with ether and the ether solution neutralized with a 15% ammonium hydroxide solution saturated with ammonium acetate. The neutralized solution was dried over anhydrous sodium sulphate and fractionated. There was obtained 68.6 parts of 43.5% of 1,2-diacetoxy propene-2.

*Example III*

306 parts of acetic anhydride and 168 parts of propargyl alcohol were charged into the boiler, heated to 115° C. and held for 15 hours. At the end of this time, titration of an aliquot portion showed the conversion to propargyl acetate to be 95.0%. The temperature of the boiler was then raised to 120° C., a slow stream of nitrogen gas started and the mixed vapors swept through the catalyst bed which was maintained at 215–230° C.

The catalyst used was the same as in Example II. The run was stopped after 121 hours. The product was treated as described in Example II and fractionated, 46 parts of pure 1,2-diacetoxy propene-2 being obtained.

Although the yield in this case was smaller, it showed that the monomeric ester may be made from propargyl alcohol without isolating the intermediate propargyl acetate. Suitable modification of the apparatus used, such as a stripping column to remove 1,2-diacetoxy propene-2 from the condensate being recycled is desirable.

I claim:

1. A process for preparing the addition product of lower alkyl monobasic organic acids to the esters of terminally unsaturated acetylenic monohydric alcohols which comprises vaporizing these two compounds and contacting them in vapor phase with a catalyst selected from the group consisting of neutral and basic salts of zinc, cadmium and mercury and continuously removing the addition product from contact with the catalyst.

2. A process for preparing the addition product of lower alkyl monobasic organic acids to the esters of terminally unsaturated acetylenic monohydric alcohols which comprises vaporizing the two reacting compounds in a common vessel, passing the vapors through a catalyst selected from the group consisting of neutral and basic salts of zinc, cadmium, mercury and supported on a porous media, condensing the vapor from said catalyst bed and returning them to said vessel.

3. A process for preparing the addition product of acetic acid and propargyl acetate which comprises vaporizing the two compounds, passing the vapors over a bed of zinc acetate supported on a porous media, condensing the vapors from the catalyst bed, returning them to the original vapor mixture and continuing said steps until substantial addition product is produced.

4. A process for preparing the addition product of acetic acid and propargyl acetate which comprises vaporizing the two compounds, passing the vapors over a bed of zinc acetate at a temperature of 220–235° C. supported on a porous media, condensing the vapors from the catalyst bed, returning them to the original vapor mixture and continuing said steps until substantial addition product is produced.

5. A process for preparing the addition product of lower alkyl monobasic organic acids to an ester of propargyl alcohol which comprises vaporizing these two compounds and contacting them in vapor phase with a catalyst selected from the group consisting of neutral and basic salts of zinc, cadmium and mercury and continuously removing the addition product from contact with the catalyst.

6. A process for preparing the addition product of acetic acid to an ester of propargyl alcohol which comprises vaporizing these two compounds and contacting them in vapor phase with a catalyst selected from the group consisting of neutral and basic salts of zinc, cadmium and mercury and continuously removing the addition product from contact with the catalyst.

7. A process for preparing the addition product of a lower alkyl monobasic organic acid and propargyl acetate which comprises vaporizing the two compounds, passing the vapors over a bed of zinc acetate supported on a porous media, condensing the vapors from the catalyst bed, returning them to the original vapor mixture and continuing said steps until substantial addition product is produced.

8. The process as defined in claim 1 wherein the catalyst salt is that of the reacting acid.

9. The process as defined in claim 2 wherein the catalyst salt is that of the reacting acid.

RICHARD S. TOWNE.

REFERENCES CITED

The following references are of record in the file of this patent:

UNITED STATES PATENTS

| Number | Name | Date |
|---|---|---|
| 1,449,913 | Skirrow et al. | Mar. 27, 1923 |
| 2,176,958 | Dreyfus | Oct. 24, 1939 |